Patented July 4, 1933

1,916,915

UNITED STATES PATENT OFFICE

CLARENCE BIRDSEYE, OF GLOUCESTER, MASSACHUSETTS, ASSIGNOR, BY MESNE ASSIGNMENTS, TO FROSTED FOODS COMPANY, INC., OF DOVER, DELAWARE, A CORPORATION OF DELAWARE

EDIBLE MEAL AND PROCESS OF PREPARING THE SAME

No Drawing.    Application filed January 10, 1929.    Serial No. 331,700.

This invention relates to edible meals and processes of preparing the same from food substances. In a broad aspect, it comprises a meal in which the particles are of a composite nature and include two or more food substances intimately united with each other. In another aspect, it consists in a novel method of preparing a dried homogeneous and composite food from solid and liquid components in a manner to produce a dried food embodying particles each of which contains elements of both said food components intimately combined.

My invention has particular application to edible meal of the types commonly used as food for live stock, and in the term "live stock" I wish to include fish. Heretofore, such meal has been made from raw, moist food products by one or the other of two general processes. In one case it has been made by separately cooking or drying the individual raw products, comminuting the dried products and then mixing the separate powdered products. This produces a meal having its individual particles composed of different materials, that is, one particle of one material and one particle of another material. Or in the second case, the products have been mixed, then cooked and thereby chemically changed and transformed into a solid body, and finally pulverized. As distinguished from these well-known processes, the process of my invention is characterized by the steps of intimately mixing the moist, raw food products and then drying the mixture in such fashion as to produce a dry granular meal or a broken amorphous mass of meal in which each particle is a composite particle including some of each of the different materials in its structure.

As an example of one valuable field of use for my invention, I will first describe its application to the production of meal particularly intended for feeding trout or other young fish in hatcheries. It has been discovered that young fish thrive and grow rapidly when fed upon meal produced from fresh fish substance, including the crushed bones, and a milk substance. In one of its more specific aspects, accordingly, my invention consists in a meal having these constituents in each of its particles, and in a novel process of preparing the same.

In my copending application Serial No. 319,450, filed November 14, 1928, I have disclosed and claimed a process of making edible meal for moist food products in which the step of drying is carried out, at least partially, at a temperature below the freezing point of the ingredients of the meal and certain important advantages are attained by employing this characteristic step. While the process of said application comprises one satisfactory procedure by which may be produced such a meal as I contemplate and which is within the scope of my present invention, I believe that a meal of composite particles such as above discussed has not heretofore been produced by any method, whether or not the material has been dried at a temperature below its freezing point. The present invention is, therefore, of broader aspect than that disclosed in my copending application.

For purposes of illustration, I will now describe the preparation of a trout food meal from fresh fish substance and milk. For this purpose I prefer to employ substantially all the fish substance, including the waste flesh, skin, bones and heads remaining after the removal from the fish of the clear flesh of the fillets. With this I mix a milk substance which may be whole milk, skim milk, sour milk, or the like. A mixture of fish substance and milk in the proportion of 3 to 1 produces a satisfactory result. The fish substance is ground until the bones are pulverized or reduced in size and whole mixture converted to a fairly homogeneous conglomerate mass. The milk is added to the ground mass and becomes thoroughly and uniformly distributed through and within it. The mixture thus produced is then dried but in such fashion as to insure the maintenance in the mass of individual composite particles each of which includes some fish substance intimately united with some milk substance. As already intimated, this may be carried out by freezing the mass, comminuting the frozen mass and then drying the frozen particles at a temperature below their freezing point. If preferred, the mixture may be dried by heat while subjected to constant agitation, but, however carried out, it is essential that the product shall be in the form of a meal or broken-up amorphous mass as distinguished from a solid body or cake.

In some cases I have found it desirable to add raw fish or beef liver to the fish substance and milk used in the preparation of a meal for trout food. In quantity, approximately 10% of fish liver or 15% of beef liver will be found a satisfactory proportion. Under these circumstances, it will be understood that the raw liver is added to the fresh fish substance and ground with it and the milk. In such case, substantially all the particles of the meal will have the three materials in their composition.

It will be understood that by adding liquid milk to the fish or meat substance and then drying the resulting mixture as above outlined, a coloidal solution of the milk in the fish or meat is obtained by the absorption of the milk in these solid constituents. The resulting meal is not a simple physical mixture that can be easily separated into its original ingredients. On the contrary, the soluble components of the milk can be dissolved from the composite particles of meal only by prolonged leaching.

Among the advantages incident to this characteristic, it may be noted that the composite meal may be fed in water to trout with slight loss of the soluble milk components, and that each composite particle retains a milk flavor which is relished by trout to an extent that renders the meal very desirable as a food for use in fish hatcheries.

While I have described my invention as applied particularly to the production of meal for feeding live stock, it may be employed to advantage in producing meal for human consumption as, for example, a meal made from clear fish flesh, milk and a spice or flavoring ingredient.

While I prefer to employ fresh fish substance in most cases, it would be within the scope of the invention to employ one or more dried ingredients and to moisten the mixture so as to insure uniform distribution and intimate contact of the milk substance in liquid form with the other ingredients of the mass. For example, the milk may be added in the form of dried milk and in such case it will dissolve in the moisture of the fish and become distributed by liquid contact and dissolving in the moist conglomerate mass. If dried fish is employed, moisture may be added as such or supplied by other moist ingredients.

I have referred specifically to fish substance as constituting the basis of the meal herein described but contemplate substituting any meat substance for a part or all of the fish substance should that be desired.

Having thus described one specific form of meal and a method of preparing it which illustrates the underlying principles of my invention, what I claim as new and desire to secure by Letters Patent is:

1. An edible meal comprising dry uncooked particles, each individual particle consisting of combined fish substance and milk substance which have been intimately mixed and united with each other in moist condition and then dried so as to form composite particles in which both said substances are united to form a food embodying fish and milk as food components thereof.

2. A food for live stock comprising a dry uncooked meal the particles of which each consists of combined fish, liver and milk which have been intimately mixed in moist condition and then dried in comminuted form so as to form composite particles each having dried milk as a food component therein.

3. A process of preparing a fish-milk food product, consisting of grinding fresh fish to a homogeneous mass, intimately mixing liquid milk therewith, and drying the resulting mixture to produce a dried food product comprising particles in each of which is embodied fish and milk food elements intimately combined.

4. A dry fish-milk food product, comprising particles in each of which is embodied fish and milk food elements intimately combined.

CLARENCE BIRDSEYE.